United States Patent [19]

Moran, III et al.

[11] Patent Number: 5,052,024
[45] Date of Patent: Sep. 24, 1991

[54] OFFSET FREQUENCY MULTIPOINT MODEM AND COMMUNICATIONS NETWORK

[75] Inventors: John L. Moran, III, Millville; Manickam R. Sridhar, Norton; Rodney Hess, Somerville, all of Mass.

[73] Assignee: Motorola, Inc., Schaumburg, Ill.

[21] Appl. No.: 528,629

[22] Filed: May 23, 1990

[51] Int. Cl.$^5$ .............................................. H04B 1/38
[52] U.S. Cl. .......................................... 375/7; 375/8; 455/73; 370/30; 370/120
[58] Field of Search ................ 375/7, 8, 109; 370/24, 370/30, 39, 69.1, 71, 120; 455/40, 51, 53, 71, 73, 75, 86

[56] References Cited

U.S. PATENT DOCUMENTS

| | | | |
|---|---|---|---|
| 2,333,719 | 11/1943 | Herold | 370/30 |
| 2,819,344 | 1/1958 | Thompson | 370/30 |
| 4,075,427 | 2/1978 | Mattsson et al. | 370/24 |
| 4,380,062 | 4/1983 | Stuart et al. | 370/24 |
| 4,489,416 | 12/1984 | Stuart | 375/8 |
| 4,847,880 | 7/1989 | Kamerman et al. | 375/8 |

Primary Examiner—Benedict V. Safourek
Assistant Examiner—Young Tse
Attorney, Agent, or Firm—Joseph P. Krause

[57] ABSTRACT

In a multipoint data communications system used with analog communications channels that may insert undesirable frequency offsets in a modem carrier frequency, a slave modem that adjusts its transmit carrier frequency compensates for the offset influenced communications channel. A central modem device does not have to train up to slightly offset frequencies when the communications channel is effectively removing the offset added by a slave modem at its transmitter site.

15 Claims, 4 Drawing Sheets

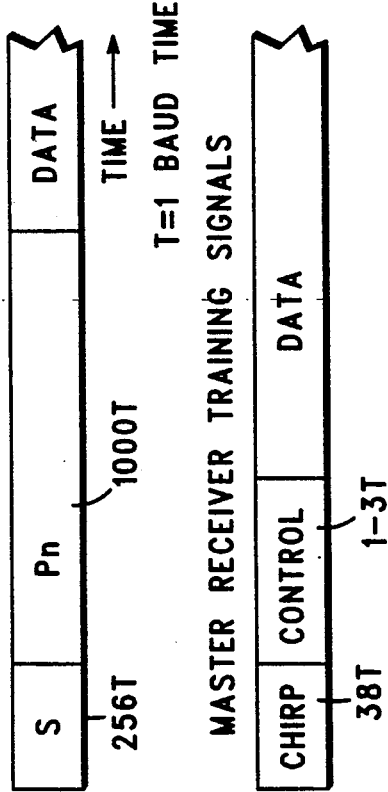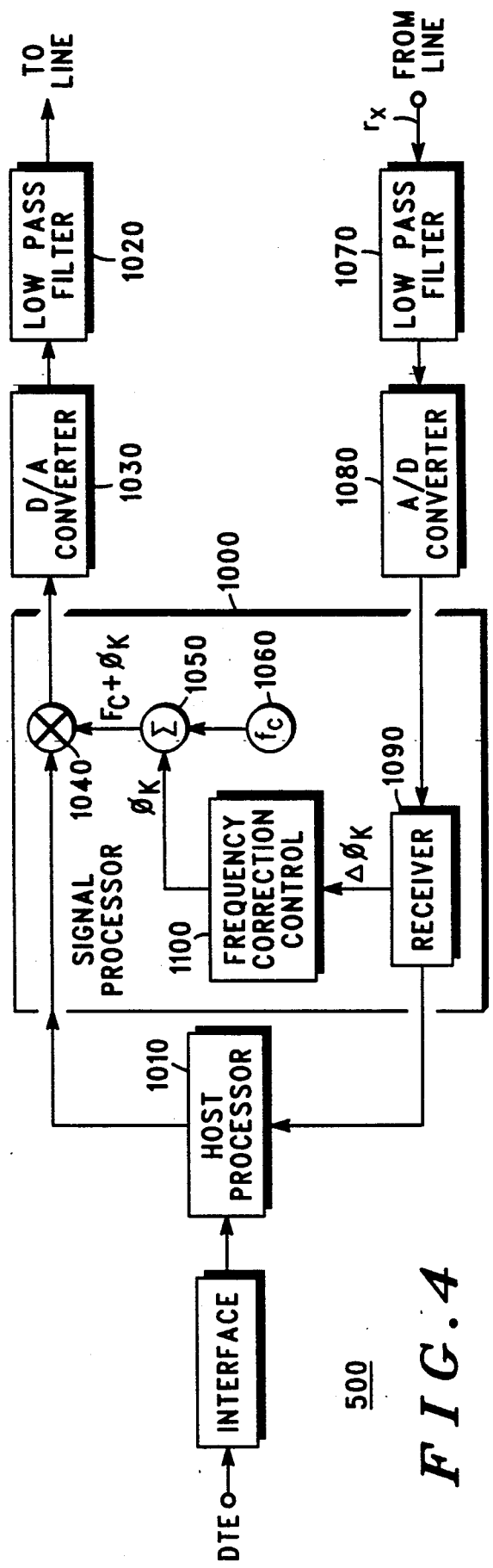

OFFSET FREQUENCY MULTIPOINT MODEM AND COMMUNICATIONS NETWORK

BACKGROUND OF THE INVENTION

This invention relates to data communications networks. In particular, this invention relates to modulator-demodulator circuits, also known as modems that are used with multipoint data communication networks. More particularly, this invention relates to multipoint modems coupled together through analog communications channels.

Computers and other types of DTE (Data Terminal Equipment) devices usually exchange digital information over telephone communication channels using so called modulator-demodulator devices or modems. Most modems receive digital information from a computer (DTE), modulate the digital information by some predetermined frequency $f_c$, and transmit the modulated digital information in an analog form onto the telephone network. Similarly, these modems demodulate an analog signal received off of a telephone communications channel using the $f_c$ carrier signal to recover any digital information therein.

In most geographic areas the public switched telephone networks convert analog information carried between switching offices to a digital format after it leaves a local end-office. In many areas however, the telephone transmission network between switching centers is still analog. In areas where transmission facilities are analog, analog multiplexing techniques, such as frequency division multiplexing or group-band multiplexing are used to carry more information more efficiently. Frequency division multiplexing or group band multiplexing frequency shifts multiple signals, each being a relatively low bandwidth signal, each to a separate frequency band or ranges at a much higher frequency. The high-frequency signal, comprised of multiple separate information signals, each transmitted using some media such as microwave or coax cable, for example, to a receiving office which de-multiplexes the information. For example, approximately 600 conversations, each having a frequency bandwidth between 200 and 3400 Hz. can be up-shifted in frequency to occupy separate 3200 Hz. channels between 564 KHz and 3084 KHz. For more details on the actual implementation, see e.g., "Transmission Systems for Communications", Bell Telephone Laboratories Revised 4th ed. Dec. 1971, Sec. 6.2, P. 124–139.

A common problem experienced with multipoint modem networks used in geographic areas where frequency division multiplexing is used to link telephone end-offices is the central modem's loss of data caused by its inability to identify the offset carrier on frequency $f_c$ (used by the central and slave modems to exchange digital information on the analog phone lines) in a short duration message sent to the central modem by a slave modem. When phone signals are frequency multiplexed on an analog communications channel, the frequency source used at one end to up-shift the signals may be slightly different from the frequency source used at the other end to down-shift the signals. In a frequency division multiplexing network, a frequency discrepancy between a local oscillator at one end of the communications channel and a local oscillator at the other end of the communications channel can change $f_c$ impeding the reliable detection of data by a modem. Since most modems modulate a carrier frequency $f_c$, which is typically a low frequency signal near 1000 to 2000 Hertz, and since the end-office may frequency modulate this $f_c$-based signal by some other high-frequency signal, a small difference, or offset, in the signals used to modulate and demodulate the $f_c$ modulated modem information, may significantly affect the frequency of $f_c$ when frequency division multiplexed channels are de-multiplexed.

In a multipoint data communications system, where a single master modem talks to a plurality of slave modems simultaneously, all of the slave modems include phase-lock loop type circuits that have the capability of detecting offset on $f_c$'s in the analog signal sent to them. These phase-locked-loop circuits all require a finite length of time during which they attempt to lock onto an incoming signal and learn the offset on $f_c$ is. In a multipoint data communications network, most of the slave modems receive substantially long signals from the master upon which their phase-locked loops can train to reliably detect and track $f_c$ including any changes in $f_c$ due to the communications channel. In multipoint modem systems however, a master typically receives only short duration messages from the slave modems when it polls a slave modem it wishes a response from. When a short duration message sent from a slave to a central modem is slightly off frequency, the master modem receiver circuitry may miss all or part of the message from the slave modem if the receiver section of the master control modem is unable to lock onto the $f_c$ that includes an offset. (Similarly, any short duration message sent to any modem with an off-frequency $f_c$ may be all or partially lost.)

Where an analog telephone network serves multipoint modems, a data communications device, or modem, that corrects for changes in $f_c$ caused by the communications channel would be an improvement over the prior art. A modem at either the master control end or the slave end of such a communications channel that has the capability of adjusting its operating characteristics to compensate for changes in the carrier frequency that the modems would use to reduce the likelihood of lost data caused by offset $f_c$ frequencies.

SUMMARY OF THE INVENTION

In a multipoint data transmission system exchanging digital information between a central DTE device coupled to an analog communications channel through a central modem device and a plurality of slave DTE devices, each coupled to the analog communications channel through slave modem devices, and where such an analog communications channel is capable of introducing undesirable frequency shifts in the carrier frequency used by the central modems and the slave modems for exchanging analog information, there is provided a slave modem device which detects changes in the carrier frequency $f_c$ which the slave modem and central modem use to communicate on. The slave modem detects changes in $f_c$ attributable to frequency shifting performed by the communications channel and adjusts $f_c$ in the slave modem such that the offset added to $f_c$ by the slave modem is subtracted by the communications channel. The master modem receives signals with offsets to $f_c$ substantially removed.

BRIEF DESCRIPTION OF THE DRAWINGS

FIGS. 3A and 3B show representative diagrams of the training sequences used by the slave receiver and master receiver modem sections.

FIG. 4 shows a simplified block diagram of the slave modems used in FIGS. 1 and 2.

DETAILED DESCRIPTION OF THE PREFERRED EMBODIMENT

Figure 1:
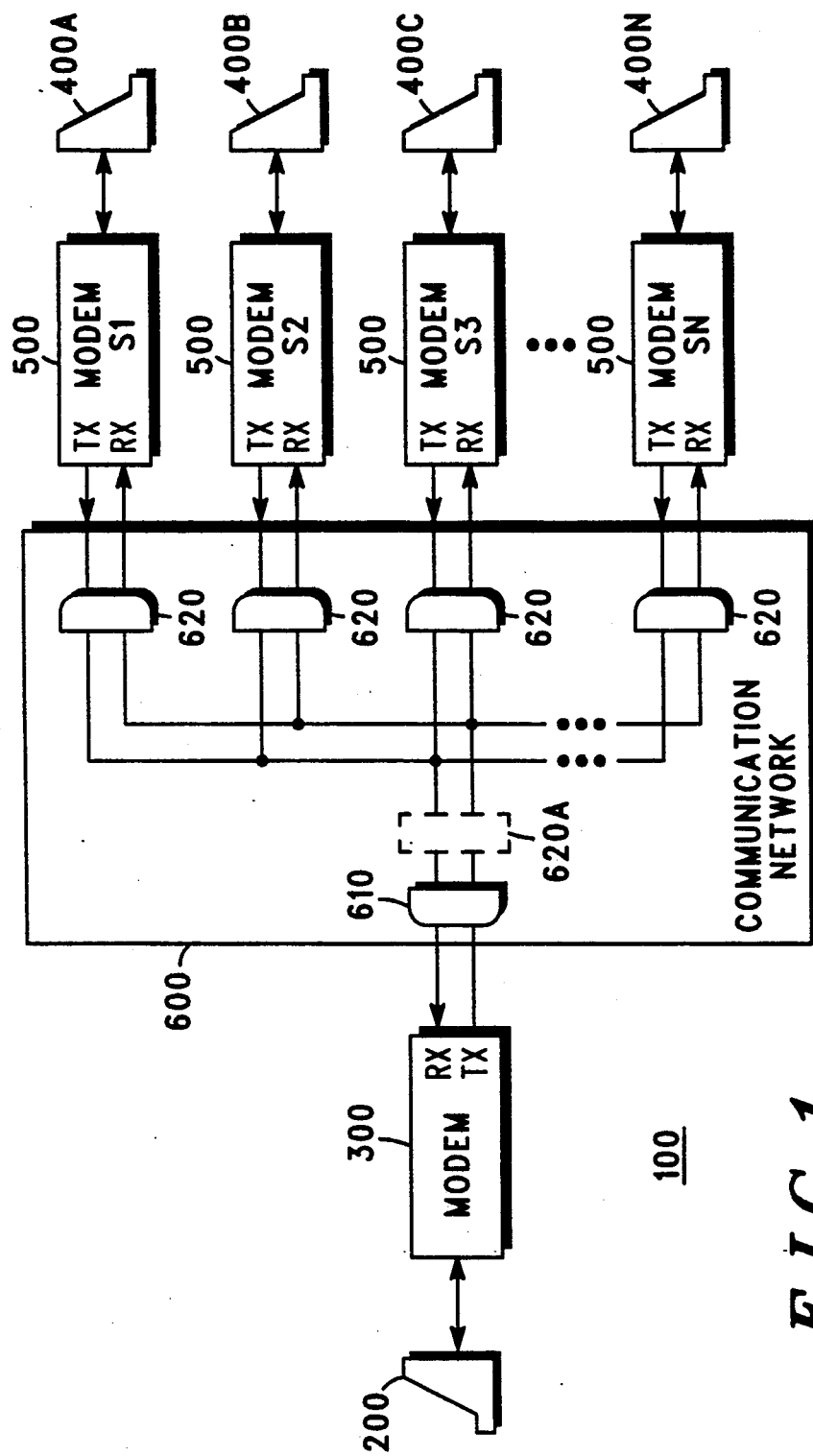
FIG. 1 shows a block diagram of the multipoint data communications system.

FIG. 1 shows a block diagram of a multipoint data communications system (100). The multipoint data communications system (100) is used to permit exchanges of digital information between a central DTE device (200) and multiple remote DTE devices (400A through 400N) as shown. The central DTE device (200) could be a computer or some other similar digital machine. The remote DTE devices (400) would also typically be computers or other digital machines well known in the art.

The central DTE device (200) and the remote or slave DTE devices (400) exchange digital information using central and slave modems (300 and 500 respectively). The central DTE device (200) has its own central modem (300) which has a transmitter section (not shown in FIG. 1) for converting digital data from the DTE device onto a communications channel (600). The central modem (300) also has a receiver section (not shown in FIG. 1) which demodulates analog signals from the communications channel (600) and sends them to the DTE device. The communications channel (600) links the central modem (300) and the slave or remote modems (500) over an analog communications channel (600), so called because the communications channel carries continuously varying electrical signals as opposed to digital communications channels that carry electrical signals representing binary one's and zeroes that represent continuously varying signals. (The communications channel might include two-wire, four-wire or other types of telephone trunks.)

The analog communications channel (600) shown in FIG. 1, the central DTE (200) and its associated modem (300), the remote DTE devices (400) and their slave modems (500) are configured in a multipoint data communications system. The central DTE (200) broadcasts messages to the slave DTE (400) devices, which are individually addressable, by sending the same message to all of the slave modems (500) simultaneously. When the central DTE (200) wishes to communicate with a particular slave DTE, the central DTE device will poll the slave DTE device of interest by sending an addressed message to it on the communications channel (600). The addressed message will include addressing information which a particular slave modem (500) or the corresponding slave DTE device can decode and identify as being addressed to it. (Addressing techniques are well known in the art. Any appropriate technique might be used to address messages to a particular modem or slave DTE device.)

In many geographic areas of the United States as well as other parts of the world, the analog communications channel (600) may group band multiplex or frequency division multiplex signals from a central DTE device (200) with other signals (the sources of which are not shown in FIG. 1). In FIG. 1, the communications channel (600) includes at least one central multiplexer (610) and a plurality of demultiplexers (620) as shown.

The multiplexer (610) receives analog communications signals from the central modem (300) and frequency shifts these signals from the modem (300) upward by some predetermined frequency $f_r$. (For more details, see "Transmission Systems for Communications", Bell Telephone Laboratories, revised 4th edition, Dec. 1971.) Frequency shifting modem signals, (as well as other types of analog signals) allows multiple analog signals to be carried on a single analog transmission media.

In FIG. 1, the demultiplexer (620) uses its own local frequency source, substantially equal to $f_r$ to demodulate the frequency multiplexed signals from the multiplexer (610). In the embodiment shown in FIG. 1, there are multiple demultiplexers (620) positioned at different remote points coupled to the communications channel (600). An alternate communications channel might include a single demultiplexer as shown (620A) which frequency shifts the signals downward for all of the individual slave modems.

In FIG. 1 it can be seen that there are multiple paths in the communications channel (600) and possibly multiple reference frequencies sources of $f_r$ at each of the demultiplexers (620). In a communications channel which frequency shifts signals between modems such as the central modem (300) and the salve modems (500), each of the frequency shifts performed by the communications channel can introduce undesirable shifts in $f_c$ that may impede the modems (300) and (500) ability to detect digital information in the signal it is receiving. Where several demultiplexers (620) are used, there exists the possibility of having several different frequency offsets in messages sent to the central modem (300) originating at each of the remote DTE's (400a, 400b, 400c, etc.).

Figure 2:
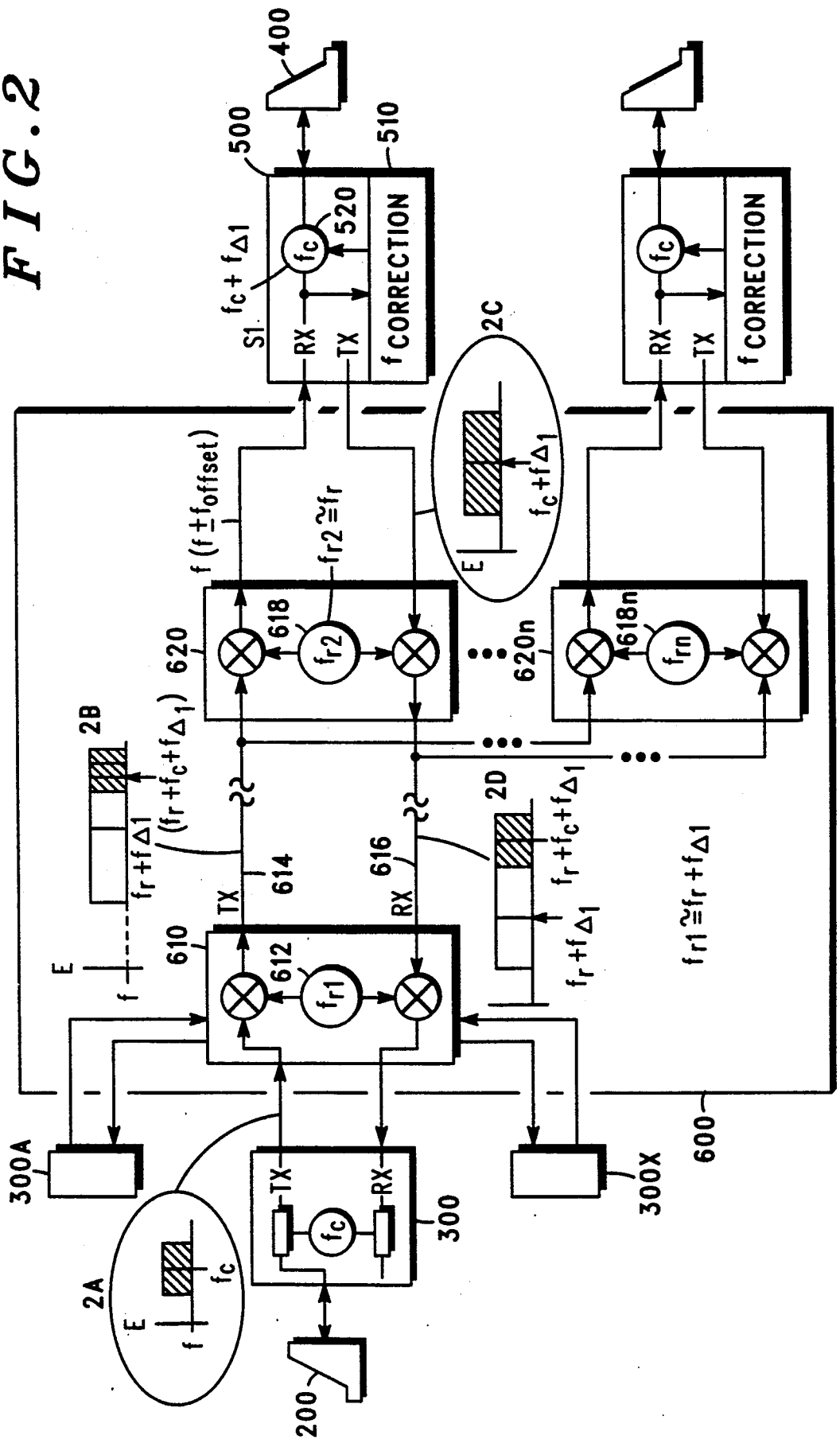
FIG. 2 shows a more detailed diagram of a multipoint communications system as shown in FIG. 1.

FIG. 2 shows a more detailed description of a multipoint data communications system. In FIG. 2, the central DTE (200) is coupled to the central data communications modem (300) over a serial data link, such as an EIA/TIA-232-D standard data link. The central modem device (300) modulates the digital data from the DTE device (200) using a carrier frequency $f_c$, producing a pass band signal. Similarly, the central modem (300) demodulates analog signals received from the communications channel (600) using the same carrier frequency $f_c$. As shown in FIGS. 2, 2A the waveform of shows the frequency energy spectrum is plotted for the output of the central data communications device showing an energy band of frequency components centered about $f_c$.

The analog signals from the central modem (300) are coupled into the frequency multiplexer (610) which receives the output from the modem (300) and multiplies the $f_c$-based signals from the modem (300) by a reference frequency $f_{r1}$ that includes an offset component, $f_{\Delta 1}$, producing a signal the frequency/energy plot of which is represented by waveform 2B. The $f_c$-centered information from the modem (300) is shifted by the multiplexer (610) upward in frequency by an amount equal to the quantity $(f_{r1}+f_{\Delta 1})$ where $f_{\Delta 1}$ is the frequency by which the actual $f_{r1}$ varies from the ideal $f_r$. (In waveform 2B the energy spectrum of the output of the modem (300) is shifted by an amount equal to $f_{r1}+f_{\Delta 1}$ as shown. The spectrum from the modem (300) that is centered above $f_c$ is now centered above some other frequency $f_{r1}+f_c$, plus $f_{\Delta 1}$ as shown.)

When the signal from the multiplexer (610) is coupled to a demultiplexer (620) which also has its own reference oscillator frequency $f_{r2}$, $f_{r2}$ is used to demodulate the output of the multiplexer (610) to recover the original frequency and spectrum from the modem (300). If the actual $f_{r1}$ is exactly equal to the ideal $f_{r1}$ (implying that $f_{\Delta 1}$ is zero), and if $f_{r1} = f_{r2}$, the analog signals output from the demultiplexes 620 will be centered about $f_c$. On the other hand, if $f_{\Delta 1}$ is non-zero, the output of the demultiplexer (620) will be as shown in waveform 2C, i.e. signals centered not about $f_c$ but centered about $(f_c + f_{\Delta 1})$. The invention contemplated herein lies in having one modem, preferably the slave modem S1, shift the frequency of $f_c$ in a predetermined direction by some amount that the communications channel effectively removes when the communications channel (600) transfers signals from the slave modem (S1) to the central modem (300). In the applications where $f_{\Delta 1}$ is positive, i.e. it acts to up-shift $f_c$, the correction signal circuitry will increase $f_c$. Where $f_{\Delta 1}$ is negative, the correction signal will decrease $f_c$.

In FIG. 1 and FIG. 2, the transmit and receive signal paths between a central modem (300) and the slave modems S1 are subject to the same frequency offset sources. Stated alternatively, a transmit signal from the central modem (300) to the slave modem S1, and a transmit signal from a slave modem (S1) to a central modem (300) will be processed using the same frequency shifting sources. (If the transmit and receive paths between the central modem (300) and the remote modem (500) are different and experience different frequency offset sources, the correction factor added by the slave modem (500) may be ineffective in reducing lost data in short duration messages to the central modem.) In FIG. 2, a slave modem S1 using correction factor circuitry described below (510) sends a signal centered about $(f_c + f_{\Delta 1})$ to the multiplexer (620). The multiplexer (620) modulates the signal from the slave modem S1 by its own oscillator frequency $f_{r2}$. Assuming that $f_{r2}$ is identically equal to $f_{r1}$, the demultiplexer (610) will receive a signal frequency shifted as shown in waveform 2D. This signal is centered about $(f_c + f_{r2} + f_{\Delta 1})$. In this example, since the original error signal $f_{\Delta 1}$ (or actual deviation of $f_{r1}$ from true $f_{r2}$) originated in the multiplexer (610), when the multiplexer (610) demodulates its input signal (616) the error component $f_{\Delta 1}$ will be subtracted out such that the signal the central modem (300) receives at its DCE receive terminal $R_x$ is centered about $f_c$ and has no error component signal $f_{\Delta 1}$.

Having messages that are sent to the central modem (300) from the slave modems (500) precisely on frequency $f_c$ enhances the probability of receiving the correct data at the master receiver.

FIG. 3A shows a representative diagram of the message content sent from a master DTE to a slave DTE. S is a synchronizing sequence typically at least 256 baud times long. $P_n$ is a training sequence typically at least 1000 baud times in length. The data may be of indefinite length. A response that a slave DTE will typically send back to a master DTE is shown in FIG. 3B. It is usually comprised of a chirp sequence, typically less than 38 baud times in length. A control frame may be between 1 and 3 baud times in length followed by any data. If a slave modem such as that shown in FIGS. 1 and 2 sends a relatively short duration message to a central DTE through the central modem (300), the modem circuitry will have to detect the offset on $f_c$ from the message data shown in FIG. 3B.

Most phase lock loop circuits in modems today are unable to lock onto an $f_c$ that has drifted or includes some offset amount in the amount of time available in the chirp sequence and the control frame. In a multipoint data communications system, the offset component in $f_c$ from the multiplexer (610) may frequently cause all or part of a message sent to the central DTE from a slave modem to be lost because of the central modem's (300) inability to track the training signals sent from the slave modem. By adjusting the frequency of $f_c$ sent from the slave modem to the central modem (300) by some predetermined amount, (an amount that is removed by the analog communications channel (600)) the central modem (300) will receive analog signals containing true $f_c$. In the circuits shown in FIG. 2, the central modem (300) does not have to train upon an $f_c$ that is offset from true $f_c$. Frequencies sent from various slave modems $S_1$ through $S_n$ over widely varying analog communications channels use $f_c$'s that are individually adjusted to compensate for individual offset frequency amounts attributable to different communication channel characteristics.

In FIG. 2, the analog communications channel (600) may include multiple multiplexer-demultiplexer circuits (620) through (620N) as shown. Each of these multiplexer circuits may have different reference frequencies $f_{r2}$ through $f_m$. It is conceivable that each multiplexer-demultiplexer combination (620N) would have differing offset frequency components for each source of $f_r$. A multipoint data communications system might be unable to accommodate such potentially widely varying communications channels without the invention taught herein.

FIG. 4 shows a simplified block diagram of the typical components of a modem contemplated in the preferred embodiment. It includes a transmitter portion comprised of a low pass filter (1020), a digital to analog converter (D/A) (1030), and a first modulator (1040) that receives digital data from a host processor (1010). The first modulator (1040) multiplies the digital data from the host processor (1010) by a carrier signal $f_c + \phi_k$. ($\phi_k$ is the correction signal added to $f_c$ to compensate for errors added by the communications channel.) The modulated data is converted by the D/A and low-pass filtered for transmission onto the communications channel. The carrier signal $f_c + \phi_k$ is produced by a second modulator (1050) that receives $f_c$ from a local oscillator (1060) and the correction signal $\phi_k$ from frequency correction control circuitry (1100) within the modem. The first modulator, 1040, the second modulator 1050, the local oscillator 1060 and the correction control circuitry 1100, are all performed by a single digital signal processor (1000).

The receiver portion of the modem includes a low-pass filter (1070), an analog to digital converter (A/D) (1080) and a receiver (1090), also part of the digital signal processor 1000 that detects the deviation of the received carrier frequency from the nominal carrier frequency $f_c$. The receiver demodulates the analog signals to recover the digital data, which it couples to the host processor (1010).

The modem shown in FIG. 4 modulates data from a DTE device by $f_c$, converts this modulated data to an analog format, low pass filters it and couples it to the transmit terminal of the communications channel. In this figure the modem (500) receives analog signals at its receiver terminal $r_x$ low pass filters these, converts them to a digital format to recover the digital data by demodulating them with $f_c$ in a receiver which then couples the data to the DTE port received data out terminal.

The receiver section of the modem detects the offset component of the signal received at the receiver terminal $r_x$. Frequency correction control circuitry in the modem is used to adjust the frequency of $f_c$ that are used by the transmitter portion of the modem (500) as shown. The modem uses frequency offset information derived from the receive signal stream to change the frequency of the carrier used in the transmit data stream so that the modem at the other end of the communications link receives $f_c$-centered signals, improving the likelihood that the modem receiving the frequency-shifted carrier can detect the digital data.

The method of the invention can be summarized by first periodically detecting any offset in the frequency of $f_c$ detected in analog signals received from the communications channel (600). Having detected an offset value on the frequency $f_c$, the $f_c$ used to transmit data is adjusted by some amount proportional to the offset detected in the received data. The adjustment made to the transmit $f_c$ is equal to an amount required to compensate for the offset value introduced into the received data stream by the communications channel.

The preferred embodiment contemplates other embellishments to the method, and the associated apparatus, for compensating the transmit $f_c$ frequency that address operating circumstances that might be encountered in actual operating environments.

In applications where the offset value $\phi_k$, is very low, the phase lock loop circuitry in modem devices may jitter as they try to lock up to the incoming frequency. The method can be improved by averaging, over some predetermined period of time, the offset frequency values detected in the receive data stream. Averaging the offset frequency obtained (since the frequency offset may vary from time-to-time) reduces the likelihood that transients or momentary fluctuations can affect the transmitter frequency.

Still another step would be to limit the lowest frequency offset that the slave modem device will use. When the offset frequency obtained from the received data stream is less than this low limit of the offset frequency a decision may be made that no adjustment of the frequency $f_c$ is appropriate.

Another improvement would be limiting the adjustment of the $f_c$ frequency when the receiver has completely lost synchronization with the incoming data. In this event the modem receiver section should first reestablish synchronization before attempting to adjust the outbound frequency of $f_c$.

Figure 5:
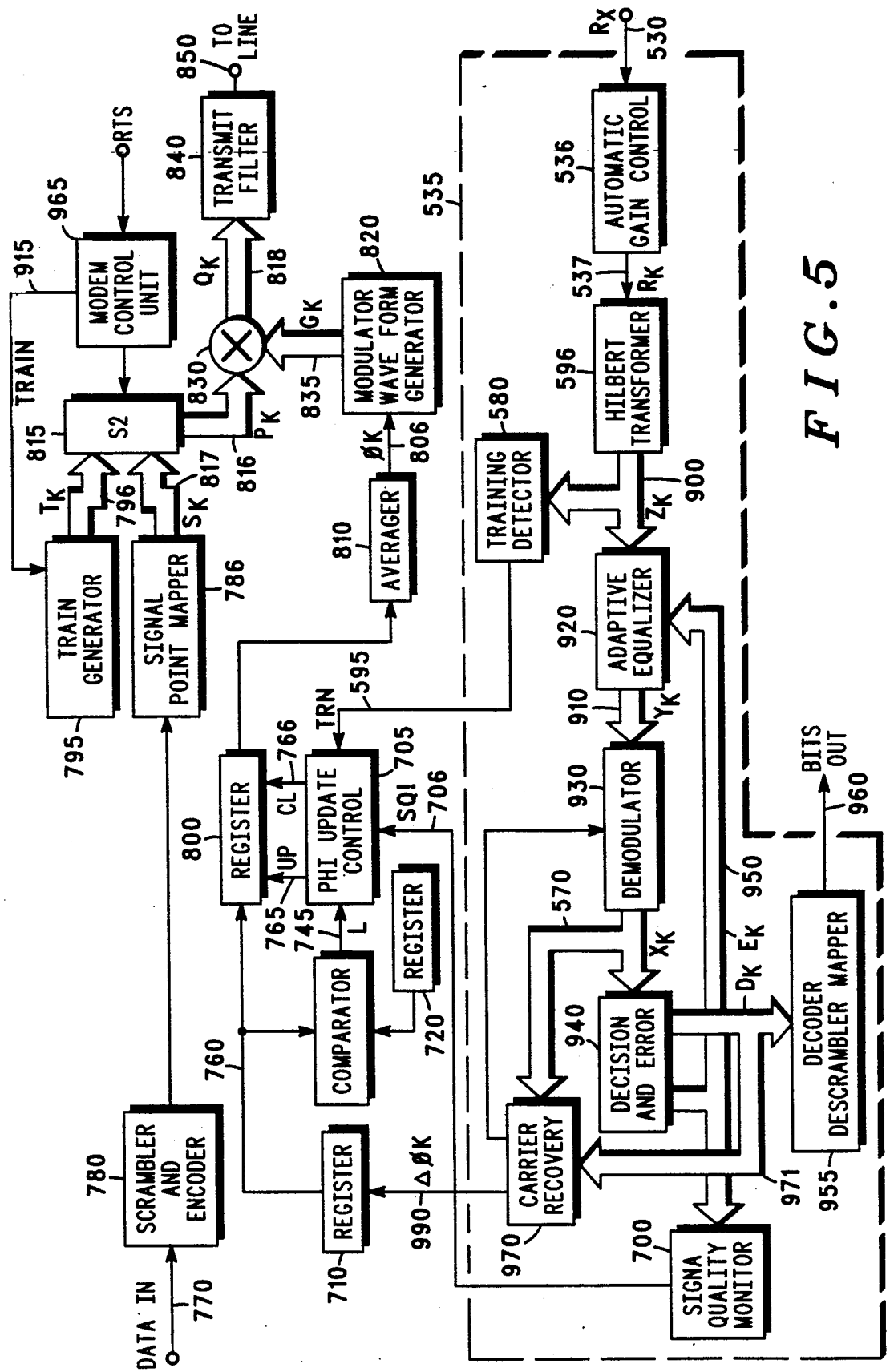
FIG. 5 shows a more detailed diagram of the preferred embodiment of the modem shown in FIGS. 1 and 2.

A block diagram of the preferred embodiment is shown in FIG. 5. In this figure the received signal $r_x$ from line 530 goes to the receiver (535) where it is processed to generate an output data stream of bits (960) representing the bit stream sent to the modem (538) by the remote modem (not shown). The receiver (535) includes a automatic gain control (AGC) module (536) that normalizes the received signal power and produces an output signal $R_K$ (537). $R_k$ (537) is applied to a Hilbert transform filter (596) that transforms $R_K$ to a complex signal $Z_K$ (900) on a sample time by sample time basis. The complex signal $Z_K$ is then applied to an adaptive equalizer module (920) which uses complex arithmetic to compute complex magnitude and phase equalized signal $Y_K$ (910) according to the formula:

$$Y_K = \sum_{i=0}^{N-1} C_i * Z_{K-i}$$

where $C_i$ are the complex coefficients of the equalizer, N is the number of complex coefficients and $Y_k$ represents the successive signals comprising the complex signal $Z_k$ (900) on a signalling interval by signalling interval basis.

The adaptive equalizer (920) is implemented as a fractionally spaced 2T/3 finite impulse response filter (FIR) where T is the baud time, in other words, the adaptive equalizer taps are spaced 2T/3 apart in time.

The adaptive equalizer output $Y_k$ (920) is demodulated by the demodulator module (930) to produce output signal $X_k$, using complex arithmetic according to the following formula.

$$X_k = Y_k * e^{-j2\pi(\partial k)}$$

Where $\partial_k$ is the current demodulation angle computed by a phase locked loop in the carrier recovery module (970) and is used in the Taylor series approximation to produce the exponent function $e^{-j2\pi(\partial k)}$. The derivation of $\partial_k$ is explained below.

The output (570) of the demodulator module $X_k$ is applied to a decision and error module (940) which decides which complex data signal $D_k$ (971) that must have been sent by the transmitter (not shown) and computes the complex apparent error signal $e_k$ (950). ($e_k$ (950) is computed as $$e_k = X_k - D_k$$

where $X_K$ is the output of the demodulator.

The signal $e_k$ (950) is used to update the complex coefficients $C_i$ of the adaptive equalizer (920) using the least mean square algorithm (LMS), well known in the art. The complex data signal $D_K$ is used by the decoder/descrambler mapper module (955) to produce the bits out (960).

Both $D_k$ (971), and $X_k$ (570) are used by the carrier recovery circuit (970) to produce the scaled frequency offset value $\Delta\phi k$ (990), which is computed as follows $$\Omega_k = (X_i D_r - X_r D_i)/(X_r^2 + X_i^2)^{-\frac{1}{2}}(D_r^2 + D_i^2)^{-\frac{1}{2}}$$

Where $\Omega_k$ = the instantaneous phase error.

The subscripts i and r stand for the real and imaginary components of the complex numbers $X_k$ and $D_k$.

A second order phase lock loop is used to track the instantaneous phase error $\Omega_k$. The second order phase lock loop has the property that it can track the frequency offset, or in other words a constant-rate phase change, with zero error. The governing equations are $$\Delta F_{k+1} = \Delta F_k + B1 * \Omega_k$$

$$\partial_{k+1} = \partial_k + 2\pi F_c T + B2 * \Omega_k + B3 * \Delta F_{k+1}$$

$$\Delta\phi_k = B3 * \Delta F_{k+1}$$

Where $\Delta F_k$ is the frequency offset learned by the phase lock loop in the k'th time interval, $F_c$ is the nominal carrier frequency used by the modem, T is the baud time or the reciprocal of the baud rate. B1, B2 are constants used to control the response of the PLL, and B3 is the normalizer which normalizes the frequency offset to map $2\pi$ to a 16 bit number representation.

$\Delta\phi_k$ (990) is the mapped frequency offset that is sent to the transmitter to offset the transmitters nominal carrier frequency $f_c$. The error signal $e_k$ (950) also goes to the signal quality monitor (700) which maintains a long term average of $e_k$ (950) and sets the signal SQ! (SQ complement) (706) to a Boolean logic 1 if the average error in the signal $r_x$ exceeds a predetermined threshold rate. The averaging by the signal quality monitor (700) is done using a single pole "leaky integrator" with a 250 millisecond second time constant, the implementation of which is well known in the art. The threshold error rate is set to indicate if the long term error in the receiver is greater than 1 bit in 1000. SQ! is set to 0 if the error is less than 1 bit in 1000. The use of SQ! (706) will become apparent later on.

The scaled frequency offset signal (990) $\Delta\phi_k$ from the carrier recovery unit (970) is controlled by the PHI update control module (705). This module monitors three input signals TRN! (505), SQ! (706), and L (745), and produces 2 outputs, UP (765) and CL (766) to control the actions that will be taken on the value of $\Delta\phi_k$ held in the NEWPHI register (710).

TRN! (595) is produced by the training detect module (580) in response to the detection of any incoming training request signals from the remote modem. If training is detected, TRN! is set to logic 1, in the absence of an incoming training request TRN! is set to logic 0.

L (745) is the output of the comparator circuit which compares the value of $\Delta\phi_k$ held in the NEWPHI register (710) to a threshold value held in the TH1 register (720). The threshold value is normally set to 0.5 Hz. The value 0.5 Hz is chosen because the receiver in the master modem (300) can work with this offset. The comparator outputs a value of 0 if the value of $\Delta\phi_k$ held in the NEWPHI register (710) is less than the value held in register TH1 and a 1 if the value of $\Delta\phi_k$ held in the NEWPHI register (710) is greater than the value held in register TH1.

The PHI update module asserts the CL signal (766) to clear the OLDPHI register if L (745) is 0, regardless of the state of the other two signals TRN! (595) and SQ! (706). If either TRN! (595) and SQ! (706) is Boolean logic 1, then the value that was previously in the OLDPHI register (800) is held. Only under the condition L=1, TRN!=0 and SQ!=0 the value of $\Delta\phi_k$ held in the NEWPHI register (710) is transferred into the OLDPHI (800) register. This is done by asserting the UP signal (765) which enables the transfer of data from the NEWPHI register (710) to the OLDPHI register (800) through line (760).

The output of the OLDPHI register (800) is then fed into an averager circuit (810). The averager circuit (810) averages the value of $\Delta\phi_k$ held in the OLDPHI register (800) over 10 milliseconds to get rid of any noise in the value $\Delta\phi_k$. The averaging is done using a single pole leaky integrator. The averager (810) then produces the value $\phi_k$ (806) that is used by the modulator wave form generator module to generate the in-phase and quadrature carriers for the transmitter $G_k$. The governing equation is $$G_k = e^{j2\pi(\partial t_k)}$$

Where $\partial t_k$ is the current modulation angle which is used by the transmitter and is computed as follows:

$$\partial t_{k+1} = \partial t_k + 2\pi F_c T + \phi_k$$

The outgoing transmission is controlled by the modem control module (965). When the modem control unit (965) determines that a message is to be sent from the local DTE (not shown) by the RTS signal from the DTE being asserted, the modem control unit (965) asserts the TRAIN signal (915) which in turn, turns on the training signal generator (795) and connects the output $T_k$ (796) to the modulator input $P_k$ (816) by setting the position of the switch S2 (815). Once the initial training sequence as shown in FIG. 3A has been sent the actual scrambled encoded and mapped message from the DTE (not shown) $S_k$ is then sent by positioning the switch S2 to connect the output of the signal point mapper $S_k$ (817) to the modulator input $P_k$ (816).

The message is in the form of a stream of bits data IN (770). A scrambler encoder (780) processes the data bit stream by (a) randomizing the bits so that no bit pattern is more likely to occur than any other pattern, (b) encoding groups of bits according to the particular code being used. The output of the said module is in turn processed by the signal point mapper (786) which maps the group of bits onto a signal constellation being used. The output of the signal point mapper (790) is a complex signal $S_K$ (shown as dark lines) which is then processed in the manner described below.

The complex signals whether derived from the training signal generator (795) or the signal point mapper (786) are then modulated by the modulator (830) by a complex carrier $G_k$ (835) generated by the modulator wave form generator (820). The modulator uses complex arithmetic to compute the output $Q_k$(818) according to the formula $$Q_k = P_k * G_K$$

The output $Q_k$ (818) of the modulator (830) is then processed by a transmit filter (840) and is used to produce a real analog signal (850) which may be transmitted over the telephone line. The transmit filter is a complex passband filter that spectrally shapes the input $Q_k$ (818) to make it transmittable over the telephone channel.

The modem is implemented by a multiprocessor architecture, as shown in FIG. 4. That is it has a general host processor (1010), which performs overall control and data movement functions; a signal processor (1000) which performs the functions of the transmitter, receiver and the frequency correction control.

What is claimed is:

1. In a data transmission system for exchanging digital information between first and second DTE devices communicating with each other using a first modem device coupled to said first DTE device and a second modem device coupled to said second DTE device, said first and second modem devices converting digital information to analog information by modulating said digital information by a carrier frequency $f_c$, said first and second modem devices converting analog information to digital information by demodulating the modulated analog information by carrier signal $f_c$, said data transmission system being comprised of:

analog communications channel means, having first and second ends, for carrying group band multiplexed signals between said first modem device at said first end and said second modem device at said second end, said first end of said analog communications channel means being coupled to said first modem device and said second end of said analog communications channel means being coupled to said second modem device and including:

first and second frequency shifting means at said first and second ends respectively for frequency shifting signals on said communications channel means by a first reference signal amount, $f_r$, said first and second frequency shifting means up-shifting signals from a modem device by $f_r$ and down-shifting signals from the communications channel to be sent to a modem device by $f_r$, said first frequency shifting means having first source of $f_r$, $f_{r1}$, said second second frequency shifting means having a second source of $f_r$, $f_{r2}$, both $f_{r1}$ and $f_{r2}$ being substantially identical to, but capable of deviating from $f_r$ by unknown amounts $f_{\Delta 1}$ and $f_{\Delta 2}$ respectively, said $f_{\Delta 1}$ and $f_{\Delta 2}$ in $f_{r1}$ and $f_{r2}$ inducing an undesirable frequency offset shift in $f_c$ by said up-shifting and down-shifting that impedes the accurate detection of digital information signals by said first and second modem devices; and correction signal means coupled to said first modem device for adding a correction factor signal amount to the frequency of $f_c$ at said first modem device to compensate for said $f_{\Delta 1}$ and said $f_{\Delta 2}$;

whereby the amount of the correction added to $f_c$ by said correction factor means compensates for frequency offset shift in said $f_c$ introduced by said communications channel means so that said that second modem device receives $f_c$-centered signals.

2. The data transmission system of claim 1 where said communications channel means includes a two-wire public switch telephone network trunk.

3. The data transmission system of claim 1 where said communications channel means includes a four-wire public switch telephone network trunk.

4. The data transmission system of claim 1 where said correction signal means increases the frequency of $f_c$.

5. The data transmission system of claim 1 where said correction signal means decreases the frequency of $f_c$.

6. A multipoint data transmission system that exchanges digital information between at least one central DTE device and a plurality of addressable remote DTE devices over a plurality of analog communications channels said central and remote DTE devices being local DTE devices to modems coupling said devices to said communications channels, said central DTE broadcasting message to remote DTE devices, said remote DTE devices sending information to the central DTE device in response to polls from the central DTE, each communications channel having different frequency transmission characteristics, said data transmission comprised of:

central modem means for exchanging digital information between a central DTE device and at least one analog communications channel, said central modem means coupling digital information from a DTE device onto said at least one analog communications channel by transmitting an analog signal representing said digital information to a communications channel by modulating said digital information by a first analog carrier frequency, $f_c$, said central modem means coupling analog information from a communications channel representing digital information for a DTE by demodulating analog signals by said $f_c$;

remote modem means for exchanging digital information between an addressable remote DTE device and at least one analog communications channel, upon receipt of a message addressed to said addressable remote DTE device from said central DTE device, said remote modem means coupling digital information from a remote DTE device onto said at least one analog communications channel by transmitting an analog signal representing said digital information to a communications channel by modulating said digital information by a first analog carrier frequency, $f_c$, said remote modem means coupling analog information from a communications channel representing digital information for a remote DTE by demodulating analog signals by said $f_c$;

communications channel means, having first and second ends, for carrying group band multiplexed signals between said central modem means at said first end and said remote modem means at said second end, said communications channel means including:

first and second frequency shifting means at said first and second ends respectively for frequency shifting signals on said communications channel means by a first reference signal amount, $f_r$, said first and second frequency shifting means up-shifting signals from a local DTE device by $f_r$ and down-shifting signals from the communications channel to be sent to a local DTE by $f_r$, said first frequency shifting means having first source of $f_r$, $f_{r1}$, said second second frequency shifting means having a second source of $f_r$, $f_{r2}$, both $f_{r1}$ and $f_{r2}$ being substantially identical to, but capable of deviating from $f_r$ by unknown amounts $f_{\Delta 1}$ and $f_{\Delta 2}$, said $f_{\Delta 1}$ and $f_{\Delta 2}$ in $f_{r1}$ and $f_{r2}$ inducing an undesirable frequency offset shift in $f_c$ by said up-shifting and down-shifting that impedes the accurate detection of digital information signals by said central and remote modem means; and correction signal means for adding a correction factor signal amount to the frequency of $f_c$ at said remote modem means that is substantially equal to said undesireable frequency offset shift in $f_c$;

whereby the amount of the correction added to $f_c$ by said correction factor means compensates for undesireable frequency offset shift in said $f_c$ introduced by said communications channel means so that said that central modem means receives signals on $f_c$.

7. The multipoint data transmission system of claim 6 where said communications channel means includes a two-wire public switch telephone network trunk.

8. The multipoint data transmission system of claim 6 where said communications channel means includes a four-wire public switch telephone network trunk.

9. The multipoint data transmission system of claim 6 where said correction signal means increases the frequency of $f_c$.

10. The multipoint data transmission system of claim 6 where said correction signal means decreases the frequency of $f_c$.

11. The multipoint data transmission system of claim 6 where said central DTE device is a computer.

12. In a multipoint data transmission system that exchanges digital information between at least one central DTE device and a plurality of remote DTE devices over a plurality of analog communications channels, said central DTE device and said remote DTE devices exchanging digital information via said plurality of analog communications channels using modem devices, at least one central modem device being associated with and coupled to said central DTE device and at least one remote modem device being associated with and coupled to each of said plurality of remote DTE devices, said central and remote modem devices converting digital information to analog information by modulating said digital information by a carrier frequency $f_c$ and which recover digital information from a modulated analog information by demodulating said analog information by carrier signal $f_c$, and wherein recovery of digital information by both said central and remote modems is impeded by shifts in $f_c$, wherein said analog communications channel frequency shifts signals thereon, said frequency shifts by said communications channel capable of inducing undesirable frequency shifts in $f_c$, wherein a remote DTE device sends a relatively short duration response message to said central device in response to a poll of the addressable remote DTE device from the central DTE device, and wherein information in short duration messages of modulated frequency-offset $f_c$ is at least partially lost by shifts in the frequency of $f_c$ a remote modem device for said multipoint data transmission system comprised of:

transmitter means for modulating digital information signals from a DTE device by $f_c$ and for coupling modulated digital information signals onto a communications channel;

receiver means for recovering digital information signals in an analog signal of modulated signal $f_c$ received from a communications channel;

correction signal means for detecting shifts in $f_c$ from said receiver means attributable to said communications channel and for adding a correction factor signal amount to the frequency of $f_c$ for said transmitter means said correction factor signal improving detection of digital information by said central modem device.

13. In a multipoint data transmission system that exchanges digital information between at least one central DTE device and a plurality of remote DTE devices over a plurality of analog communications channels, at least one central modem device being associated with and coupled to said central DTE device and at least one remote modem device being associated with and coupled to each of said plurality of remote DTE devices, said central and remote modem devices exchanging digital information by converting digital information to analog information in a transmitter in each of said modem devices modulating said digital information by a carrier frequency $f_c$ and which recover digital information from a modulated analog information in a receiver in each of said modem devices demodulating said analog information by carrier signal $f_c$, and wherein recovery of digital information by both said central and remote modems is impeded by shifts in $f_c$, wherein said analog communications channel capable of inducing undesirable frequency shifts in $f_c$ that can impede the detection of digital information by said central and remote modem device, a method of improving the recovery of digital information at said central modem device comprised of:

at said remote modem device:
periodically detecting undesirable frequency shifts in $f_c$ in analog signals received from said communications channels;
adjusting the frequency of $f_c$ in said remote modem by an amount proportional to the average undesirable frequency shifts in $f_c$ value.

14. The method of claim 13, after the step of periodically detecting undesirable frequency shifts in $f_c$ and before the step of adjusting the frequency of $f_c$ in said remote modem, further adding the steps of:
averaging undesirable frequency shift amounts from the receiver;
limiting the lowest undesirable frequency shift amount the remote modem device will use.

15. The method of claim 14, before the step of adjusting the frequency of $f_c$ in said remote modem device, further adding the steps of:
not adjusting the frequency of $f_c$ when the average value of undesirable frequency offset shift in $f_c$ is less than the lowest amount of undesirable frequency offset shifts that the remote modem will use;
limiting updates of undesirable frequency shifts in $f_c$ when the remote receiver has lost synchronization.

* * * * *